United States Patent [19]

Gajria et al.

[11] Patent Number: 4,560,714

[45] Date of Patent: Dec. 24, 1985

[54] WATER-SWELLABLE CROSSLINKED POLYMERIC MICROGEL PARTICLES AND AQUEOUS DISPERSIONS OF ORGANIC FILM-FORMING RESINS CONTAINING THE SAME

[75] Inventors: Chandrasen Gajria, Louisville, Ky.; Yehuda Ozari, Arcadia, Calif.

[73] Assignee: Celanese Corporation, New York, N.Y.

[21] Appl. No.: 692,464

[22] Filed: Jan. 18, 1985

Related U.S. Application Data

[62] Division of Ser. No. 449,887, Dec. 16, 1982, abandoned.

[51] Int. Cl.$^4$ .............................................. C08K 3/20
[52] U.S. Cl. ................................. 523/409; 523/411; 523/412; 524/508; 524/510; 524/512; 524/513; 524/514; 524/522
[58] Field of Search .................. 523/404, 411, 412; 524/508, 510, 512, 513, 514, 522

[56] References Cited

U.S. PATENT DOCUMENTS

| | | | |
|---|---|---|---|
| 3,118,848 | 1/1964 | Lombardi et al. | 260/29.3 |
| 3,156,740 | 11/1964 | Bussell | 260/834 |
| 3,215,756 | 11/1965 | Lombardi et al. | 260/834 |
| 3,331,805 | 7/1967 | Mandel | 260/39 |
| 3,403,088 | 9/1968 | Hart | 204/181 |
| 3,418,392 | 12/1968 | Leitner | 260/834 |
| 3,467,730 | 9/1969 | Hicks | 260/834 |
| 3,492,252 | 1/1970 | Euchner et al. | 260/8 |
| 3,652,472 | 3/1972 | Clarke et al. | 260/22 CB |
| 3,880,796 | 4/1975 | Christenson et al. | 260/33.6 UA |
| 3,908,049 | 9/1975 | Fitko | 427/386 |
| 3,960,979 | 6/1976 | Khanna | 260/834 |
| 4,055,607 | 10/1977 | Sullivan et al. | 260/851 |
| 4,139,514 | 2/1979 | Bassett | 260/29.6 H |
| 4,172,066 | 10/1979 | Zweigle et al. | 260/29.6 TA |
| 4,289,811 | 9/1981 | Shelley, Jr. | 427/239 |

FOREIGN PATENT DOCUMENTS 967051 8/1964 United Kingdom.

*Primary Examiner*—Joseph L. Schofer
*Assistant Examiner*—Bernard Lipman
*Attorney, Agent, or Firm*—Herbert P. Price

[57] ABSTRACT

Disclosed are carboxylic acid containing polymeric microgel particles which are prepared by polymerizing in aqueous emulsion a monomer mixture containing about 10-50% by weight of polymerizable carboxylic acid monomers, up to 5% of a difunctional crosslinking monomer and one or more carboxyl-free relatively water insoluble polymerizable vinyl monomers. The resulting microgel particles are water-swellable and may be employed as stabilizers for use in the preparation of aqueous dispersions of film-forming resins containing smaller amounts of organic solvents than conventional aqueous dispersions of this type. Such dispersions are useful as coating compositions, yielding coatings having less water sensitivity and improved adhesion as compared with coatings obtained from conventional aqueous dispersions of film-forming resins.

9 Claims, No Drawings

WATER-SWELLABLE CROSSLINKED POLYMERIC MICROGEL PARTICLES AND AQUEOUS DISPERSIONS OF ORGANIC FILM-FORMING RESINS CONTAINING THE SAME

This is a divisional of co-pending application Ser. No. 449,887 filed on Dec. 16, 1982, now abandoned.

BACKGROUND OF THE INVENTION

The present invention relates generally to polymeric microgel particles and to thermosetting coating compositions containing such microgel particles which are useful for coating substrates such as metal surfaces.

In the manufacture of metal containers, such as for example aluminum or steel food and beverage containers, a thin protective coating of a thermoset film is applied to the interior of the container in order to prevent contact of the interior of the container with its contents. Such coatings ideally should exhibit good adhesion to the interior metal surface of the container, particularly when the contents of the container are acidic in nature, good stain resistance, low extractables to prevent contamination of the container contents, and a rapid cure rate for economy of container manufacture. Typical synthetic resins which have been utilized in such coatings include, for example, the heat-curable vinyl, butadiene, epoxy, phenolic, alkyl/aminoplast and oleoresinous based polymers.

In one common method of application, coatings of the aforementioned resins have been applied to the metallic interior of the containers in the form of a solution or dispersion of the heat-curable resin in a volatile organic solvent. Coatings formulated in this manner have in practice proven less than desirable since during the drying and curing cycle of the coating operation, vaporization of the solvent creates significant work place pollution problems which have necessitated the use of costly solvent recovery procedures in order to comply with governmental safety and pollution regulations.

Among the various methods which have been proposed to avoid the use of organic solvents in preparing synthetic resin coatings for metal surfaces is to formulate the coating as an aqueous dispersion.

In commonly assigned U.S. Pat. No. 4,289,811, for example, there is described thermosettable coating compositions useful for coating metal surfaces such as cans which comprise an aqueous dispersion of a heat-curable epoxy resin, an aminoplast resin, and an acrylic type interpolymer comprising the copolymerization product of from about 20 to 90 weight percent of a polymerizable $\alpha,\beta$-ethylenically unsaturated carboxylic acid monomer and from about 10 to 80 weight percent of one or more polymerizable carboxyl-free vinyl monomers. The disclosed aqueous dispersions are prepared by dissolving the aminoplast resin in a water-miscible organic solvent, adding the aforementioned monomers to the solution and then heating the solution to form a polymerization product solution containing the aminoplast resin and the acrylic type interpolymer; admixing the resulting solution with the epoxy resin, neutralizing the admixture with ammonia or an organic amine; and then dispersing the admixture into an aqueous medium to form an aqueous dispersion having a solids content of from about 15 to 40 weight percent.

U.S. Pat. No. 3,908,049 also describes a method for coating metal surfaces using aqueous dispersions of film-forming resins. This method involves preparing an aqueous dispersion containing a mixture of a neutralized water-dispersible carboxylic acid containing polymer having a carboxyl content of at least 8% by weight, a water-dispersible heat-curable thermosetting aminoplast or polyepoxide resin and a water-insoluble, long chain monohydroxy alcohol having 8–36 carbon atoms; applying the aqueous dispersion to a metal surface; and then baking the coating at 350°–450° F. to volatilize the alcohol and cure the coating.

In U.S. Pat. No. 3,960,979, it has further been proposed to coat the interior of food and beverage cans by hot melt spray gun with a fast curing, high solids coating composition comprising a blend of (a) a low molecular weight epoxy resin, (b) a liquid nitrogen resin or phenolic crosslinking agent, (c) a flexibilizing polyol, (d) an inorganic or organic monomeric or polymeric acid which acts both as reactant and catalyst, and (e) optionally a surface modifier such as an acrylic polymer containing acrylic acid.

In addition to the foregoing can coating formulations, various other coating compositions containing acrylic type polymers and/or mixtures thereof with other film-forming resins are known to those skilled in the art.

U.S. Pat. No. 3,492,252 describes latex coating compositions comprising an emulsion polymerized acidic interpolymer having a carboxyl content of from 1 to 30 weight percent, preferably from 3 to 15 weight percent; a monomeric diepoxide or a mixture thereof with a bisphenol-epichlorohydrin condensation product having an epoxy equivalent weight of less than 200; and, optionally, a water-soluble, heat-reactive film-forming material such as an aminoplast or phenol/formaldehyde condensation product. The disclosed compositions are useful as protective films for metal substrates which have been previously coated with pigmented primer, and are prepared by synthesizing via emulsion polymerization techniques a latex of the acidic interpolymer and then adding thereto the epoxy and water-soluble film-forming components, either as is, or in the form of emulsions.

U.S. Pat. No. 3,418,392 discloses thermosetting interpolymer emulsions containing as a crosslinking agent the mixture of a polycycloaliphatic polyepoxide (e.g., 3,4-epoxy-6-methylcyclohexylmethyl 2,4-epoxy-6-methylcyclohexanecarboxylate) and a reactive triazine compound (e.g. hexamethoxymethylmelamine), which are prepared by polymerizing a thermosetting interpolymer containing at least one reactive monomer unit using standard aqueous emulsion polymerization techniques and then adding to the resulting polymer emulsion from about 0.5 to 30% by weight of the crosslinking agent mixture. Such coating compositions are recommended for use in textile print pastes, padding liquor for pigment dyeing of textiles, nonwoven textile impregnation dispersions, and generally as solvent based protective coatings for metal surfaces and the like.

U.S. Pat. No. 3,331,805 describes resin binder compositions for use in treating woven and non-woven fabrics. The disclosed binder compositions comprise a linear copolymer containing at least 50% by weight of a monoethylenically unsaturated organic ester having from 4 to 9 carbon atoms and from about 1 to 5% by weight of an unsaturated carboxylic acid, and a two-component crosslinking system comprising a mixture of equal amounts of an alkylated melamine formaldehyde resin and a diepoxide resin. The binder system may be employed in the form of an aqueous dispersion or solution, or alternatively in the form of a slurry of fibrids obtained by shear precipitation of a dispersion of the resin.

U.S. Pat. No. 4,139,514 discloses translucent to clear, water-borne polymer compositions comprising aqueous, essentially organic solvent-free solutions of interpolymer. Such compositions are prepared by forming a polymer latex by emulsion polymerization of a mixture of (1) acrylic acid and/or methacrylic acid; (2) an acrylate or methacrylate ester; and, optionally; (3) a polymerizable ethylenically unsaturated monomer having a terminal vinyl group. The resulting latexes are then neutralized with a base to solubilize the polymer, yielding the water-borne polymer compositions. Such compositions are recommended for use as coatings or inks.

U.S. Pat. No. 3,118,848 describes coating compositions which are prepared by mixing together a water-soluble salt of a vinyl polymer, and a water-soluble epoxy or polyhydroxy compound. One or more water-soluble phenol-aldehyde or amino resins, notably water-soluble urea-aldehyde or melamine-aldehyde resins, may optionally be included as curing agents where low baking temperatures are contemplated.

U.S. Pat. No. 3,156,740 describes thermosetting acrylic resin compositions adapted for application as coatings to protect metal surfaces from the action of water, soap, grease, light and prolonged heat. Illustrative of the preparation of a thermosetting resin composition, there are co-reacted (a) a copolymer of 2–10% of acrylic acid, 4.5–88% styrene and 9–93% of 2-ethylhexyl acrylate and (b) 1-epoxyethyl-3,4-epoxycyclohexane, and then there is mixed therein (c) 1-epoxyethyl-3,4-epoxycyclohexane, following which there is mixed therein (d) a melamine/formaldehyde resin in an amount of 5–50% by weight based on the total nonvolatile content of the composition.

U.S. Pat. No. 3,215,756 describes heat-curable mixtures of a vinyl polymer with an epoxy compound in the presence of an amino resin. For example, a methacrylic acid/methyl acrylate copolymer is admixed with a polyglycidyl ether of Bisphenol A and a urea-formaldehyde resin in an organic solvent, and then coated on a substrate and baked to a thermoset film.

U.S. Pat. No. 3,403,088 describes water-dispersed coating compositions which can be applied by electrodeposition. The coating compositions contain an at least partially neutralized acrylic interpolymer and an amine-aldehyde condensation product or a polyepoxide or both.

U.S. Pat. No. 3,467,730 describes heat-convertible coating compositions which are prepared from carboxy-containing copolymers, epoxide resins and aminoplast resins. In an example, 37 grams of a 50% copolymer (72% styrene, 20% methyl acrylate and 8% acrylic acid) solution, 6.9 grams of a polyglycidyl ether of Bisphenol A and 8.3 grams of a butylated urea-formaldehyde resin were blended, drawn down on glass, and cured at 200° C. for 30 minutes.

Various types of microgel particles and coating compositions containing the same have also been developed heretofore by those skilled in the art.

U.S. Pat. No. 4,172,066, for example, describes water-swellable, shear resistant microgel particles having a water-swollen diameter of from about 0.5 to about 200 micrometers comprising particles of crosslinked, preferably water-soluble addition polymer. Such microgel particles are prepared by the inverse emulsion or suspension polymerization of water-soluble monomers such as acrylamide or mixtures thereof with other water-soluble monomers such as acrylic or methacrylic acid with a small amount of a crosslinking agent, and may be employed as thickening agents for styrene/butadiene copolymer latexes or as water permeability reducing agents in well drilling applications.

British Pat. No. 967,051 discloses crosslinked, polymeric microgel particles, comprising from 95 to 99 mole percent of monoethylenically unsaturated monomer, at least 50% of which is a lower alkyl ester of methacrylic acid, and from 5 to 0.1 mole percent of a crosslinking agent, which are substantially free of uncrosslinked polymer having a viscosity average molecular weight of greater than 200,000 and have a swelling ratio in toluene of from 2 to 6. The disclosed microgel particles are prepared by polymerizing an aqueous emulsion of the monoethylenically unsaturated monomer and crosslinking agent until the reaction is from 80 to 95% complete, and then, following the addition of an agent to inhibit the formation of high molecular weight uncrosslinked material, completing the polymerization reaction. After completion of the polymerization reaction, the resulting microgel particles are filtered and dried, and then formulated into a coating composition by mixing with an organic solvent to form a microsol. Optionally, an organic solvent soluble film-forming resin, such as a polymethacrylate, epoxy or alkyd resin, may also be employed in the microsol coating composition.

U.S. Pat. No. 4,055,607 describes high solids thermosetting acrylic polymer solutions which comprise a thermosetting acrylic interpolymer containing reactive carboxylic acid and hydroxy groups dissolved in an organic solvent; at least 0.5 percent by weight of crosslinked microgel particles; and an aminoplast resin. The crosslinked microgel particles comprise the addition copolymerization product of hydroxy-containing and hydroxy-free monomers and a dispersion stabilizer which is prepared from methacrylic acid, glycidyl methacrylate and the reaction product of poly-12-hydroxystearic acid and glycidyl methacrylate.

Nonaqueous coating compositions containing similar microgel particles are also described in U.S. Pat. Nos. 3,880,796 and 3,652,472.

Despite the various advances and improvements in coating compositions described above, the art has nonetheless continued its search for further improvements in coating compositions suitable for use in coating metal surfaces such as the interior of food and beverage containers. The nonaqueous coating compositions described above, for example, while suitable for some uses, are formulated from organic solvents such as xylene, etc., which are unsuitable for use in food or beverage container applications. Moreover, while the aqueous based coating compositions mitigate somewhat the problems associated with the use of organic solvents, further reductions in the organic solvent content of these compositions and improvements in coating adhesion would be desirable.

SUMMARY OF THE INVENTION

Accordingly, it is an object of the present invention to provide an improved heat-curable resin coating system suitable for use in coating metal and other substrates.

It is a particular object of the present invention to provide a coating system which comprises a stable dispersion of heat-curable resins in water which yields coatings having improved adhesion to metal surfaces.

It is a further object of the present invention to provide crosslinked polymeric microgel particles which are suitable for use as stabilizers in the preparation of stable aqueous dispersions of heat-curable film-forming resins and which yield coatings having improved adhesion to metal surfaces.

It is a specific object of the instant invention to provide stable aqueous dispersions of thermosetting organic film-forming resins which are stabilized by polymeric microgel particles and which are suitable for use in coating food and beverage containers.

It is another object of the present invention to provide a method for coating metal surfaces with a protective coating of a thermosettable film-forming resin which yields coatings having improved adhesion to metal surfaces and less water sensitivity than coatings produced from conventional aqueous dispersions of film-forming resin.

Still another object of the present invention is to provide a method for preparing stable aqueous dispersions of film-forming resins which employs polymeric microgel particles to stabilize the film-forming resin in the aqueous solvent medium.

In accordance with the present invention, these and other objects are achieved through the provision of a novel class of polymeric microgel particles which are characterized by being water-dispersible, water-swellable, crosslinked polymer particles comprising the aqueous emulsion polymerization product of from about 10–50% based on total monomer weight of polymerizable carboxylic acid monomers, up to 5% based on total monomer weight of a difunctional crosslinking monomer, and one or more carboxyl-free, relatively water insoluble polymerizable vinyl monomers. Preferred microgel particles in accordance with the present invention also preferably exhibit a stability in aqueous media of at least one week, and more preferably at least about four weeks, when an aqueous dispersion of the microgel particles of about 20 weight percent solids content is maintained at 140° F.

The instant microgel particles find utility as thickening agents for aqueous solutions or as agents for reducing the permeability of porous structures in petroleum operations. A particularly preferred use of the instant microgel particles, however, is as stabilizers for use in the preparation of aqueous dispersions of film-forming resins. In a further embodiment, the present invention thus also provides stable aqueous dispersions of film-forming resins. These dispersions comprise at least one water-dispersible organic film-forming resin dissolved in an organic water-miscible solvent, and from about 10 to about 50% by weight, based on the total weight of the solids portion of the dispersion, of the above-described microgel particles, dispersed in an aqueous solvent medium.

Due to the high dispersing ability of the microgel particles of this invention, stable aqueous dispersions of film-forming resins containing less than about 20% by weight, and preferably less than about 15% by weight of organic solvent may readily be formulated using the above-described microgel particles as stabilizers. In contrast, the conventional aqueous dispersions of this type typically contain an organic solvent content of from about 20 to about 30% by weight. Moreover, coatings produced from the instant dispersions exhibit less water sensitivity and improved adhesion to metal substrates than coatings obtained from the prior art aqueous dispersions.

In other embodiments, the present invention also provides a method for the preparation of the above-described aqueous dispersions. This method comprises the steps of dissolving at least one water-dispersible organic film-forming resin in a water-miscible organic solvent to form a solution of the resin, adding and admixing together from about 10 to about 50% by weight, based on the total solids of the solution, of the subject microgel particles to the resin solution; at least partially neutralizing the resulting admixture with ammonia or an organic base; and then dispersing the admixture into an aqueous medium to provide a stable aqueous resin dispersion having a total solids content of from about 15 to about 40 weight percent.

Other objects and advantages, as well as the scope, nature and utilization of the invention will be apparent to those of ordinary skill in the art from the following detailed description of the preferred embodiments of the instant invention.

DETAILED DESCRIPTION OF THE PREFERRED EMBODIMENTS

As is well known to those skilled in the art, microgel particles comprise small particles of polymer gel which generally have a diameter in the micrometer range or less. Typically such particles have a size which ranges from about 0.05 to 200 microns in diameter.

The microgel particles of this invention comprise the polymerization product of from about 10–50% based on the total monomer weight, of polymerizable carboxylic acid monomers, up to 5%, based on the total monomer weight, of a difunctional crosslinking monomer; and one or more carboxyl-free, relatively water-insoluble polymerizable vinyl monomers, which form the balance or major portion of the polymerization product. Optionally, minor amounts of various other polymerizable monomers, which do not adversely effect the polymerization reaction and/or the performance of the microgel particles may be substituted for a portion of the carboxyl-free, relatively water-insoluble polymerizable vinyl monomers.

Key characteristics of the instant microgel particles include the use of aqueous emulsion polymerization techniques for the preparation thereof, a high acid functionality, water-swellability and the ability to form stable dispersions in aqueous media, either by themselves or with various water-dispersible film-forming resins. As used herein, the term "water-dispersible" means that the resin or other polymeric material neither forms a solution with water nor forms a precipitated mass of insoluble nonparticulate gel therein, but instead forms a suspension of discrete particles with the aqueous medium.

As a result of the aforementioned characteristics of the microgel particles of this invention, the instant microgel particles may advantageously be employed in applications requiring rapid sorption of aqueous fluids, e.g. sanitary articles such as diapers, belt pads and the like, and in applications wherein the swelling or partial plugging properties of the polymer are particularly important, e.g. in the plugging of porous formations or structures such as in enhanced oil recovery operations or any of the various other petroluem operations described in U.S. Pat. No. 4,172,066, the entirety of which is herein incorporated by reference. The instant microgels may also be usefully employed as thickening agents for aqueous solutions or water-containing compositions.

Due to their excellent stability in aqueous media and high dispersing power, however, the microgels of this invention are particularly suited for use in the preparation of aqueous dispersions of water-dispersible resins, such as aqueous dispersions of heat-curable film-forming resins. Among its various other characteristics, the present microgel particles exhibit a stability in aqueous media of at least one week, and preferably at least about four weeks when an aqueous dispersion of the microgel particles of about 20% solids content is maintained at 140° F. As a result of this excellent stability in aqueous media, aqueous dispersions containing reduced amounts of organic solvent as compared with conventional aqueous dispersions of this type may readily be prepared using the instant microgel particles as dispersion stabilizers. For example, aqueous epoxy dispersions have been prepared by the present inventors utilizing the microgels of this invention with as little as 11% by weight of organic solvent. In contrast, conventional epoxy dispersions typically have required at least 17% by weight of organic solvent in order to provide dispersions of practical stability.

While it is known for example from U.S. Pat. Nos. 4,289,811 and 3,908,049 to employ water-dispersible interpolymers having a high acid functionality as stabilizers for aqueous dispersions of film-forming resins, the instant microgels differ significantly from the prior art stabilizers in two important respects: (1) the microgel particles of this invention are crosslinked and thus exist in the finished coating as discrete particles which are dispersed in a matrix of the film-forming resin rather than comprising part of the resinous matrix itself; and (2) the present microgel particles have a much larger molecular weight than the stabilizers heretofore employed by the art.

As described above, the microgels of this invention are prepared by aqueous emulsion polymerization. As is well known to those skilled in the art, aqueous emulsion polymerization yields polymers of higher molecular weight than similar polymers prepared by solution polymerization in organic solvents. The stabilizers which have heretofore been employed in the prior art for the preparation of aqueous dispersions of water-dispersible film-forming resins have been prepared by solution polymerization in organic solvents and thus have possessed a lower molecular weight than the instant microgels. The stabilizers of U.S. Pat. No. 4,289,811, for example, typically have a number average molecular weight of at most about 150,000. In contrast, the instant microgels have number average molecular weights which range from about $10^5$ to about $10^6$ or more.

While not wishing to be bound by any specific theory or mode of operation, it is believed that the particulate nature and enhanced molecular weight of the present microgel particles contribute to the superior performance of the invention microgels as stabilizers for aqueous dispersions of water-dispersible resins. In addition to yielding dispersions of reduced organic solvent content, coatings produced from aqueous dispersions of film-forming resins containing the instant microgels have surprisingly been found to exhibit improved adhesion and less water sensitivity than coatings produced from conventional dispersions containing the non-crosslinked, low molecular weight interpolymers of the prior art as stabilizers. This result is believed to be due to the fact that, in contrast to the prior art stabilizers, the microgels of this application exist as discrete particles in the finished coating, and in addition have a higher molecular weight which decreases their sensitivity to water.

The microgels of this invention can broadly be described as crosslinked particles of copolymer containing as its essential monomeric components a small amount of a difunctional crosslinking monomer, a polymerizable carboxylic acid monomer and one or more polymerizable, carboxyl-free, relatively water-insoluble vinyl monomers. The exact chemical composition of the microgels can vary widely and is limited only by the requirements that the resulting microgels be water-dispersible as defined hereinabove, be swellable in water and have a stability in aqueous media such that an aqueous dispersion of the microgel of about 20% by weight solids content has a stability of at least one week, and preferably at least about four weeks when maintained at 140° F. For the purposes of the present invention, stable dispersions in accordance with the foregoing test comprise those dispersions in which less than 10%, based on the total solids content, of the microgel particles exist in the form of a precipitated mass of insoluble polymer.

The water-swellability of a given microgel formulation may be conveniently determined by measuring the change in viscosity which results when an aqueous emulsion of microgel particles (such as, for example, the emulsion obtained from emulsion polymerization of the microgel particles) is treated with ammonia or an organic amine in an amount sufficient to neutralize the free carboxylic acid groups of the microgel (further details relating to this neutralization treatment are set forth hereinafter). Upon neutralization, microgel particles suitable for use in the present invention swell in the aqueous emulsion, with the result that the viscosity of the emulsion visibly increases. The relative amount of viscosity increase is a function of the inherent water-swellability of the microgel formulation, with highly water-swellable microgels producing large increases in viscosity and non-swellable microgels producing little or no viscosity increase in the emulsion. Microgel formulations which are particularly preferred for use herein typically produce viscosity increases of at least 25%, based upon the viscosity of the emulsion prior to neutralization. Microgel formulations which are not water-swellable according to the above-described test exhibit low stabilities in aqueous media and do not have sufficient dispersing power to stabilize aqueous dispersions of film-forming resins for commercially desirable periods of time.

Microgel formulations satisfying the foregoing requirements will typically comprise from about 10–50%, preferably from about 25 to about 45%, and most preferably from about 30 to about 40% by total weight of the monomer mixture of the polymerizable carboxylic acid monomer; a small amount ranging up to about 5%, preferably from about 1 to about 3% by total weight of the monomer mixture of the difunctional crosslinking monomer; and a major amount, frequently the balance of the microgel composition, of the relatively water-insoluble, carboxylic free polymerizable vinyl monomer.

The polymerizable carboxylic acid monomer comprises an $\alpha,\beta$-ethylenically unsaturated carboxylic acid which is substantially non-gelling when polymerized in aqueous emulsion with the various other components of the microgel. As used herein, the term "substantially non-gelling" means that polymerization of the carboxylic acid monomer in aqueous emulsion does not produce a precipitated mass of non-particulate gel, but instead produces discrete polymer particles of microgel dimension. Carboxylic acid monomers polymerizable in aqueous emulsion without gelling are well known to those skilled in the art. Examples of such acids include methacrylic acid, crotonic acid, itaconic acid (or anhydride), maleic acid (or anhydride), fumaric acid, various other substituted acrylic acids wherein the hydrocarbyl substituent contains from 3 to 8 carbon atoms, and the monoesters of dicarboxylic acids such as methyl hydrogen maleate, ethyl hydrogen fumarate, and the like, of which methacrylic acid is particularly preferred. Acrylic acid itself is not preferred for use in the instant microgels since this acid produces undesirable non-particulate polymer gels during polymerization in aqueous emulsion. If desired, the polymerizable carboxylic acid component may include a small portion (e.g. 1 or 2% by weight) of acrylic acid or other gelling carboxylic acid monomer in an amount which does not substantially alter the non-gelling characteristics of the monomer mixture. It is preferred, however, that the carboxylic acid component comprise only non-gelling monomers such as methacrylic acid.

The second essential monomeric component of the microgel particles is the relatively water-insoluble, carboxyl-free polymerizable vinyl monomer. Suitable monomers of this class include those carboxyl-free vinyl monomers which are polymerizable in aqueous emulsion and which have a greater affinity for water-insoluble film-forming resins such as epoxy or phenolic resins than for an aqueous solvent medium. The carboxyl free vinyl monomer need not be completely water-insoluble. It is sufficient for the purposes of this invention if the vinyl monomer is sufficiently water-insoluble to produce water-dispersible polymers. Monomers satisfying this requirement are well known to those skilled in the art. Typical examples of such monomers include polymerizable vinyl aromatic monomers such as styrene, the o-, m- and p- alkyl or aryl styrenes wherein the substituent group has from 1 to about 8 carbon atoms such as o-methylstyrene, m-ethylstyrene, p-methyl styrene, p-tertbutylstyrene, the 2,4-, 2,5- and 3,4-dimethylstyrenes, 4-methoxystyrene, 4-phenylstyrene, 4-phenoxystyrene, 4-benzylstyrene, 2,6-dimethoxystyrene, 2,5-diethylstyrene, α-methylstyrene, 3,4-alphamethyl styrene, halostyrenes such as 4-chlorostyrene, the 2,5-, 3,4- and 2,6-dichlorostyrenes, the corresponding fluorostyrenes, as well as any of the various other substituted styrenes which satisfy the various solubility and polymerizability requirements discussed above, vinyl toluene, isopropenyl toluene, and vinylnaphthalene; alkyl or aryl esters of the $\alpha,\beta$-ethylenically unsaturated carboxylic acids having from 1 to about 8 carbon atoms in the ester (alcohol) group, such as the methyl, ethyl, propyl, butyl, hexyl, ethylhexyl, phenyl and benzyl acrylates, methacrylates and crotonates; dimethyl maleate; dibutylmaleate; dibutylfumarate; dihexylitaconate; nitrile monomers such as acrylonitrile and methacrylonitrile; vinyl halides such as vinyl chloride, vinyl bromide, etc.; vinyl esters such as vinyl acetate, vinyl propionate, vinyl stearate, vinyl butyrate, vinyl laurate, etc.; and mixtures thereof. Preferred monomers within the aforementioned class of materials include the various polymerizable vinyl aromatic monomers, methacrylate ester monomers, nitrile monomers and vinyl halide monomers described above, of which styrene and methyl methacrylate are particularly preferred.

Monomers within the aforementioned groups of materials may be polymerized with the carboxylic acid monomer and the cross-linking monomer to form microgels having useful properties. Dispersions of improved stability are obtained, however, when the carboxyl-free vinyl monomeric component comprises a mixture of two or more polymerizable carboxyl-free vinyl monomers. Preferred mixtures of carboxyl-free vinyl monomers for use in the instant microgels comprise a substantial portion (i.e. more than half), based on the total amount of the carboxyl-free monomeric component present in the microgel, of one or more polymerizable vinyl aromatic monomers, methacrylate ester monomers, nitrile monomers, vinyl halide monomers or mixtures thereof with a lesser amount of one or more monomers selected from the class of vinyl ester monomers, alkyl acrylate monomers and mixtures thereof. In this embodiment, the vinyl ester monomer or alkyl acrylate monomer will typically comprise less than about 10% by weight, based on the total monomer weight of the microgel formulation. Examples of suitable carboxyl-free vinyl monomer mixtures which are particularly preferred for use herein include mixtures of styrene and/or methyl methacrylate with vinyl acetate and/or ethyl acrylate, such as styrene/vinyl acetate mixtures, styrene/ethyl acrylate mixtures, styrene/methyl methacrylate/vinyl acetate mixtures, styrene/methyl methacrylate/ethyl acrylate mixtures, etc.

The difunctional crosslinking monomer is employed in an amount sufficient to crosslink the aqueous emulsion copolymer, thereby converting the copolymer to a non-linear polymeric microgel, without appreciably reducing the water swellability characteristics of the copolymer. Suitable amounts of crosslinking monomer can readily be determined for a given microgel recipe by examining the water-swellability of the finished microgel, as described above. Microgels satisfying this water-swellability test will typically contain up to about 5% based on the total monomer weight of the difunctional crosslinking monomer, and preferably from about 1 to about 3% of the difunctional crosslinking monomer. Illustrative of difunctional crosslinking agents which may be used in the instant microgels are compounds such as ethylene glycol dimethacrylate, tetraethylene glycol dimethacrylate, methylene bisacrylamide, methylene bismethacrylamide, divinyl benzene, vinyl methacrylate, vinyl crotonate, vinyl acrylate, divinyl acetylene, trivinyl benzene, glycerine trimethylacrylate, pentaerythritol tetramethacrylate, triallyl cyanurate, divinyl ethane, divinyl sulfide, divinyl sulfone, hexatriene, triethylene glycol dimethacrylate, diallyl cyanamide, glycol diacrylate, ethylene glycol divinyl ether, diallyl phthalate, divinyl dimethyl silane and glycerol trivinyl ether, of which divinylbenzene is particularly preferred.

Microgel formulations which have been found to be particularly useful as stabilizers for use in the preparation of aqueous dispersions of water-dispersible resins comprise from about 10 to about 50%, preferably from about 25 to about 45%, and most preferably from about 30 to about 40% by weight of methacrylic acid or mixtures thereof with other $\alpha,\beta$-ethylenically unsaturated carboxylic acid monomers; and up to about 5%, preferably from about 1 to 3% of divinylbenzene; with the balance of the microgel comprising carboxyl group free polymerizable vinyl monomers such as the polymerizable vinyl aromatic monomers, methacrylate ester monomers, nitrile monomers, vinyl halide monomers, mixtures thereof, and mixtures thereof with minor amounts (i.e. less than 50% by weight of the total carboxyl-free vinyl monomer present) of vinyl ester monomers and alkyl acrylate monomers, all weights being based on the total monomer weight except where otherwise noted. Within this subgenus, microgels comprising copolymers of methacrylic acid and divinylbenzene in the above-defined amounts; from about 10 to about 90%, preferably from about 35 to about 65% of styrene; from about 0 to about 50%, preferably from about 10 to about 30% of methyl methacrylate; and from about 0 to about 10% of ethyl acrylate and/or vinyl acetate are most preferred.

The microgel particles may be prepared by any conventional aqeous emulsion polymerization technique known to those skilled in the art. Suitable polymerization techniques of this type are described for example, in U.S. Pat. Nos. 3,492,252 and 4,139,514, the entirety of which are herein incorporated by reference. Typically, the microgel particles are prepared by emulsifying the monomeric materials, and a water soluble polymerization catalyst, in water with a suitable emulsifier for the monomers, and then heating the resulting aqueous emulsion at a temperature of from about 30° C. to about 95° C., preferably from about 60° C. to about 80° C., in a stirred heated reactor for a time of from about one to about four hours until the polymerization reaction is substantially complete. The ratio of monomer to water media is selected in order to provide a polymer emulsion having a solids content of from about 10 to about 45%, and preferably from about 20 to about 40% by weight.

The polymerization process can be carried out batchwise or continuously. It is possible to work entirely batchwise, emulsifying the entire charge of monomers and proceeding with polymerization. It is usually advantageous, however, to start with part of the monomers which are to be used and add more monomers as polymerization proceeds. An advantage of the gradual addition of monomers lies in reaching a high solids content with optimum control and with maximum uniformity of product. Additional catalysts may also be added as polymerization proceeds.

Typically emulsifiers which may be employed include any of the conventional emulsifiers utilized in aqueous emulsion polymerizations such as the alkyl salts of various hydrocarbon sulfates and sulfonates such as sodium lauryl sulfate and sodium dodecylbenzene sulfonate, alkylphenoxypolyethoxyethanols having alkyl groups of about seven to twelve carbon atoms, such as heptylphenoxypolyethoxyethanols, octylphenoxypolyethoxyethanols, methyloctylphenoxypolyethoxyethanols, nonylphenoxypolyethoxyethanols, dodecylphenoxypolyethoxyethanols, and the like; polyethoxyethanol derivatives of methylene linked alkyl phenols; sulfur-containing agents such as those made by condensing the required proportion of ethylene oxide with nonyl, dodecyl, tetradecyl, and the like mercaptans or with alkylthiophenols having alkyl groups of six to fifteen carbon atoms; ethylene oxide derivatives of long-chain carboxylic acids, such as lauric, myristic, palmitic, oleic, and the like or mixtures of acids such as found in tall oil; ethylene oxide condensates of long-chained alcohols, such as octyl, decyl, lauryl, or cetyl alcohols, ethylene oxide derivatives of etherified or esterified polyhydroxy compounds having a hydrophobic hydrocarbon chain, etc.

The amounts of emulsifier or emulsifiers required vary primarily with the concentration of monomers to be handled and to a minor extent with choice of emulsifier, monomers, and proportions of monomer. Generally, the amount of emulsifying agent is between 2% and 12% of the weight of the mixture of monomers and is preferably 4% to 7% of this weight. If the emulsion is to contain a relatively low concentration of microgel somewhat less tha minimum emulsifying agent indicated by the above rule may prove desirable. In such case the concentration of emulsifying agent in the aqueous emulsion may desirably be at least 1% of the emulsion and may be as much as about 7% of the weight of the aqueous emulsion.

The polymerization catalyst likewise may comprise any of the water soluble emulsion polymerization catalysts known to those skilled in the art. The concentration of the catalyst may vary from 0.01 to 3 weight percent based on the weight of monomers charged; it is preferably from 0.05 to 2 weight percent and most preferably from 0.1 to 1 weight percent. The particular concentration used in any instance will depend upon the specific monomer mixture undergoing reaction and the specific catalyst employed; these facts are known to those skilled in the art. It is also known that traces of metal ions can be added as activators to improve the rate of polymerization, if desired. Illustrative of suitable catalysts one can mention hydrogen peroxide, peracetic acid, t-butyl hydroperoxide, di-t-butyl hydroperoxide, dibenzyol peroxide, benzoyl hydroperoxide, 2,4-dichlorobenzoyl peroxide, 2,5-dimethyl-2,5-bis(hydroperoxy) hexane, perbenzoic acid, t-butyl peroxypivalate, t-butyl peracetate, dilauroyl peroxide, dicapryloyl peroxide, distearoyl peroxide, dibenzoyl peroxide, diisopropyl peroxydicarbonate, didecyl peroxydicarbonate, dieicosyl peroxydicarbonate, di-t-butyl perbenzoate, 2,2-azobis-2,4-dimethylvaleronitrile, ammonium persulfate, potassium persulfate, sodium persulfate, sodium perphosphate, azobisisobutyronitrile, as well as any of the other known catalysts. Also useful are the redox catalyst systems such as sodium persulfate-sodium formaldehyde sulfoxylate, cumene hydroperoxide-sodium metabisulfite, hydrogen peroxide-ascorbic acid, and the other known redox systems.

A chain transfer agent may optionally be present during the polymerization reaction at a concentration of from about 0 to about 5 weight percent. The preferred chain transfer agents are those that are relatively water-soluble since they are more effective in the aqueous polymerization system than are those that are water-insoluble. Illustrative of such materials are the known alkyl and aryl mercaptans such as the essentially water soluble butyl mercaptans, mercaptoacetic acid, mercaptoethanol, 3-mercapto-1,2-propanediol and 2-methyl-2-propanethiol. Many water insoluble mercaptans can also be used, such as t-dodecyl mercaptan, phenyl mercaptan, pentaerythritol tetramercaptopropionate, octyldecyl mercaptan, tetradecyl mercaptan. If a chain transfer agent is employed, it is preferred that only small amounts within the aforementioned range be utilized in order to minimize the inhibitory effect of these materials on the formation of high molecular weight microgel particles.

Upon completion of the polymerization reaction, the emulsion has an appearance similar to a polymeric latex. The microgel containing emulsion may be either used as is, for example in the preparation of aqueous dispersions of water-dispersible resins, or alternatively the microgel may be recovered in dry form by cooling and then drying the emulsion in an oven to provide a dried microgel. This latter material may then be powdered and employed for any of the various purposes discussed above.

A particularly preferred use of the microgel particles of this invention is as stabilizers for aqueous dispersions of water-dispersible resins. While broadly such dispersions may contain any resin known to those skilled in the art which is dispersible in aqueous media, where the dispersion is designed for use as a coating composition, the water-dispersible resin will generally comprise a water-dispersible film-forming resin such as the heat curable film-forming resins and especially the heat curable, thermosetting film-forming resins. Illustrative of this group of materials are the heat curable, thermosetting epoxy, phenolic, polyester, alkyd, and aminoplast resins, as well as the various mixtures thereof. Such resins are well known to those skilled in the art of coating composition manufacture and are widely available commercially.

Aqueous dispersions finding particular advantage for coating metal surfaces such as metallic food and beverage containers will typically contain mixtures of one or more epoxy and/or phenolic resins in admixture with one or more aminoplast resins. In addition to contributing to the film-forming characteristics of the coating, the aminoplast resin also serves to crosslink the epoxy and/or phenolic resin. The epoxy and/or phenolic resins need not necessarily be employed in admixture with the aminoplast resin. The enhanced crosslinking resulting from the conjoint use of these resins with an aminoplast resin contributes, however, to the strength and toughness of the protective coating, and for this reason preferred dispersions in accordance with this invention preferably contain one or more epoxy and/or phenolic resins in combination with one or more aminoplast resins.

Epoxy resins particularly advantageous for use in the coating compositions, i.e. aqueous dispersions, of this invention are glycidyl polyethers of polyhydric phenols and hydrogenated phenols which contain more than one 1,2-epoxide group per molecule. Such polyepoxide resins are derived from an epihalohydrin and a polyhydric phenol or hydrogenated phenol and have epoxide equivalent weights of about 150 to about 8,000. Examples of epihalohydrins are epichlorohydrin, epibromohydrin and epiiodohydrin with epichlorohydrin being preferred. Polyhydric phenols are examplified by resorcinol, hydroquinone, p,p'-dihydroxydiphenylpropane (or Bisphenol A as it is commonly called), p,p'-dihydroxydiphenyl ethane, bis(2-hydroxynaphthyl)methane, 1,5-dihydroxynaphthalene, novolak resins made from the reaction of mono and diphenols with aldehydes, phloroglucinol and the like, with Bisphenol A being preferred. Epoxy resins made from hydrogenated versions of these phenols are also useful in this invention. These epoxy resins are well known in the art and are made in desired molecular weights by reacting the epichlorohydrin and the polyhydric compound in various ratios or by reacting a dihydric phenol with a lower molecular weight epoxy resin. Particularly preferred epoxy resins for use in this invention are glycidyl polyethers of Bisphenol A having epoxide equivalent weights of about 1000 to about 4000. Commercially available epoxy resins of this type include the Epi-Rez 540 and Epi-Rez 550 epoxy resins marketed by Celanese Specialty Resins Company and Epon 1007 and 1009 epoxy resins marketed by the Shell Chemical Company.

Preferred phenolic resins comprise the reaction product of a phenol or substituted phenol with various aldehydes using an alkaline catalyst and a molar excess of the aldehyde (i.e. resole resins). Examples of suitable phenolic compounds include phenol itself, cresol, xylenol and substituted phenols such as the alkylated phenols, with phenol and alkylated phenols such as para-tertiary butyl phenol, para-tertiary amyl phenol, and para-tertiary octyl phenol being particularly preferred. Suitable aldehydes include any of the aldehydes commonly used for use in phenolic resins, with formaldehyde being particularly preferred. Commercially available phenolic resins of this type include the Varcum 2980, Varcum 5416, Varcum 5797, Varcum 8345 and Varcum 8357 resins marketed by Reichhold Chemical Company and the Phenodur 285 and 307 resins marketed by American Hoechst.

The aminoplast component employed can be any of the aldehyde condensation products of compounds such as urea, ethylene urea, dicyandiamide, various triazines, e.g., melamine, benzoguanamine and acetoguanamine, and the like; and mixtures and etherified derivatives of these condensation products.

Procedures for preparing aminoplasts are described in *Aminoplasts*, C. P. Vale (Cleaver-Hume Press, Ltd., London). Further illustration of aminoplast preparation and application is set forth in U.S. Pat. Nos. 2,957,835; 3,501,429; 3,522,159; 3,535,148; 3,773,721; 3,852,375; 3,891,590; 3,954,715; 3,965,058; 3,979,478; 4,071,578; and the like.

The aldehyde used in preparation of the aminoplasts may be (1) monofunctional or (2) polyfunctional, having at least two aldehyde groups separated by at most one carbon atom; such as formaldehyde, paraformaldehyde, polyoxymethylene, trioxane, acrolein, and aliphatic or cyclic aldehydes such as glyoxal, acetaldehyde, propionaldehyde, butyraldehyde, and furfuraldehyde. Condensation, when using formaldehyde, furfuraldehyde, paraformaldehyde, polyoxymethylene or trioxane, is generally accomplished with the use of a mildly acid or mildly alkaline catalyst. When using acrolein, glyoxal acetaldehyde, propionaldehyde, or butyraldehyde, condensation is generally accomplished by combining the reactants in the presence of a strongly acid catalyst, neutralizing the reaction product, adding more aldehyde, and further reacting in the presence of a mildly acid, or alkaline catalyst. The preferred aldehyde is formaldehyde.

The aldehyde condensation products (i.e., aminoplasts) contain methylol or similar alkylol groups, the structure of the alkylol group depending upon the particular aldehyde employed. All or part of these alkylol groups may be etherified by reaction with an alcohol. Among the preferred amine-aldehyde products for use in the present invention are those which are substantially alkylated by an etherification reaction, i.e., in which at least a major portion of the alkylol groups have been reacted with an alcohol. Essentially any monohydric alcohol can be employed for this purpose, including such alcohols as methanol, ethanol, propanol, butanol, heptanol and other alkanols having up to about 12 carbon atoms or more, as well as benzyl alcohol and other aromatic alcohols, cyclic alcohols such as cyclohexanol, monoethers of glycols such as the Cellosolves and Carbitols, and halogen-substituted or other substituted alcohols, such as 3-chloro-propanol.

When using alcohols having more than about 4 carbon atoms, the methylol groups are first etherified with a lower alcohol containing 1 to 4 carbon atoms followed by ether interchange reaction to replace the lower alcohols with the higher ones. The preferred alcohols are methanol, butanol, and similar lower alkanols with methanol being most preferred.

Particularly preferred aminoplasts are those based on melamine, formaldehyde and methanol. Commercially available aminoplasts of this type include Cymel 301 and Cymel 303 marketed by American Cyanamid.

The aqueous dispersions of this invention may be prepared by dissolving at least one of the various film-forming or other water-dispersible resins in an organic solvent to form a solution of the resin. To facilitate formation of the resin solution, the admixture of resin and organic solvent is usually heated at a temperature of from about 70° C. to about 150° C. until the resin is substantially completely dissolved. As discussed above, in the preferred embodiment, the film-forming resin admixed with the organic solvent preferably comprises one or more heat-curable thermosetting epoxy and/or phenolic resins, desirably in combination with one or more aminoplast resins. The aminoplast resin may either be added to the mixture conjointly with the various other film-forming resins, or alternatively the addition of the aminoplast may be delayed until later in the preparation sequence as set forth more fully below.

The organic solvent is preferably one which is substantially water-miscible, either in the form of a single polar compound, or as a mixture of compounds which can include non-polar constituents. The boiling point of the organic solvent component preferably will vary in the range between about 150° F. to about 500° F.

Suitable organic solvents, either alone or in admixture, include diisobutyl ketone, methyl isobutyl ketone, hydroxyethyl acetate, 2-ethoxyethyl acetate, propylene glycol monomethyl and/or monoethyl ether, ethylene glycol monobutyl ether, ethylene glycol, propylene glycol, butylene glycol, diethylene glycol, isopropanol, n-butanol, t-butanol, amyl alcohol, cyclohexanol, dioxane, tetrahydrofuran, dimethylformamide, dimethylacetamide, and the like. Non-polar solvents which can be included as a minor constituent of the organic solvent component include aliphatic and aromatic hydrocarbons such as naphtha, heptane, hexane, mineral spirits, decane, benzene, chlorobenzene, toluene, xylene, and the like.

To the resulting resin solution, maintained at a temperature of from about 80° C. to about 100° C., a stabilizing amount of microgel formulation is then added and thoroughly mixed in to provide a homogeneous mixture. The microgel formulation is conveniently prepared in advance of the dispersion preparation and may be employed either in the form of a dry microgel powder, or alternatively in the form of an aqueous dispersion of microgel particles. In this latter embodiment, the aqueous dispersion of microgel conveniently comprises the aqueous microgel emulsion obtained during polymerization of the microgel particles The resulting resin/microgel solution is thereafter dispersed in an aqueous solvent medium by first neutralizing the acid groups of the microgel and then adding the aqueous solvent medium. A water-in-oil emulsion is first formed, which as more water is added inverts to form an oil-in-water dispersion.

The neutralization step is accomplished by treating the resin/microgel solution with a basic reagent in an amount sufficient to at least partially neutralize the carboxylic acidity which is present. It is essential that the degree of neutralization be sufficient to provide a product medium pH which is in the range between about 2 to about 10, and preferably in the range between about 4 and about 8. Besides improving the solubility properties of the resinous constituents, the neutralization step suppresses the level of functional group interaction and imparts stability to the emulsion.

As another important aspect of the present invention, it is essential that the neutralized carboxylic acid groups in the dispersion coating composition be converted to free carboxylic acid groups during any subsequent heat-curing cycle to which the coating composition is subjected. In order to satisfy this requirement, it is preferred to employ a basic reagent for the neutralization step which is either ammonia or a volatile organic amine.

Illustrative of suitable basic reagents are primary, secondary and tertiary amine compounds, such as ethylamine, butylamine, dimethylamine, diisopropylamine, dimethylethylamine, cyclohexylamine, allylamine, benzylamine, m-toluidine, morpholine, ethanolamine, diethanolamine, triethanolamine, and the like and other basic reagents such as ammonium hydroxide.

If the aminoplast resin has not been added previously, the aminoplast is then added to the neutralized emulsion to complete the coating composition. The resulting dispersion normally is in the form of a single phase suspension of solubilized resin solids and microgel particles having an average resin particle size of less than one micron. As discussed above, the microgel particles present in the dispersion preferably have an average particle size of less than about one micron.

The aqueous dispersions of this invention will generally contain from about 50 to about 90%, more preferably from about 60 to about 80%, and most preferably from about 65 to about 80% by weight based on the total solids weight of the dispersion of the film-forming resin or resins, stabilized with from about 10 to about 50%, preferably from about 20 to about 40%, and most preferably from about 20 to about 35% by weight of microgel particles, again based on the total solids weight of the dispersion.

The amount of organic solvent present in the dispersion will usually be less than about 20%, and preferably less than about 15% by weight, based on the total weight of the composition. As discussed above, a unique feature of the aqueous dispersions of this invention is the ability to formulate dispersions containing smaller amounts of organic solvents than conventional dispersions of film-forming resins. It is most preferred therefore that the organic solvent be used in as small quantities as possible, i.e., that amount just sufficient to dissolve the film-forming resin.

The quantity of water employed for the dispersion-forming procedure can vary over a broad range as dictated by practical considerations. A typical aqueous dispersion will have a solids content in the range between about 15 to about 40 weight percent, and preferably in the range between about 20 to about 30 weight percent, based on the total weight of the aqueous dispersion.

In the particularly preferred dispersions described above containing one or more epoxy resins and/or phenolic resins in combination with one or more aminoplast resins, the epoxy and/or phenolic resins will generally be present in an amount of from about 50 to about 90%, preferably from about 53 to about 78% by total weight of the solids portion of the dispersion. The aminoplast component will typically comprise from about 0 to about 10%, preferably from about 2 to about 7%, based on the total solids weight of the dispersion, with the organic solvent, microgel and aqueous solvent medium being employed in the amounts described above.

Optionally there can be incorporated into the invention aqueous dispersion coating composition other components which do not interfere with the stability and other advantageous properties of the coating composition. Illustrative of an additional component which may be employed is between about 0.05–5 weight percent of a plasticizer, based on the weight of the resinous film-forming solids in a coating composition. Typical plasticizers include butyl benzyl phthalate, dibutyl phthalate, triphenyl phosphate, dicyclohexyl phthalate, dibenzyl phthalate, mixed benzoic acid and fatty oil acid esters of pentaerythritol, diethyleneglycol dibenzoate, butyl phthalyl butyl glycolate, tricresyl phosphate, toluene ethyl sulfonamide, hexamethylene diphthalate, and the like. Additional other components are colorants, waxes and the like.

An aqueous dispersion of mixed resins produced in accordance with the present invention process inherently has exceptional phase stability and shelf-life. A typical aqueous dispersion coating composition of the present invention can remain substantially unchanged for more than one year at 77° F. An invention aqueous dispersion coating composition is capable of tolerating a 120° F. temperature for more than three months without any apparent visible change in the dispersion phases.

As noted previously, during the baking and curing phase the volatile basic reagent employed to neutralize the coating composition evolves from the applied coating, thereby providing free reactive carboxyl groups. The said reactive carboxyl groups interact with the epoxy groups of the epoxy component to yield crosslinked ester linkages. Hydroxyl groups which are initially present and which are formed in situ during the baking cycle are highly reactive and condense with the aminoplast component, thereby providing an additional crosslinking mechanism.

The coating compositions of this invention are particularly useful as coating compositions for the interior of aluminum and steel can and can be applied to the interior of said cans by airless spray application. The closures of such cans can also be coated with the compositions of this invention, such coatings being applied by roller coating processes. The coatings for cans are applied to dry film thicknesses of 0.1 to 0.5 mil and are cured by passing the metal through gas fired ovens heated to 315° F. to 425° F. in stages. The total residence time in these ovens is a matter of seconds, 30 seconds to 4 minutes.

In other applications, i.e., as metal primer coatings, the coating compositions are cured at a temperature of about 300° F. to about 500° F. for a time sufficient to obtain a cure. The coating compositions can be formulated into clear coatings as hereinbefore described or into pigmented coatings. Pigments can be added using well known formulating procedures. Other additives which can be incorporated in the coating compositions are coalescing solvents, leveling agents, wetting agents, dispersions of other resins, water soluble resins, thickening agents, suspending agents, surfactants, defoamers, adhesion promoters, and the like.

The following examples are presented to more clearly define the invention. Parts and percentages unless otherwise designated are parts and percentages by weight.

EXAMPLE 1

To a suitable polymerization reactor equipped with a stirrer, reflux condenser, thermometer, and an inlet for nitrogen gas were added 1624 grams of water, 11.4 grams of Siponate DS-10 (a sodium dodecyl benzene sulfonate surfactant available from Alcolac, Inc.), and 7.4 grams of n-butanol. The mixture was stirred and nitrogen flow started. The following monomer formulation was then added: 284 grams of styrene, 169 grams of methacrylic acid, 29 grams of vinyl acetate, and 10 grams of divinyl benzene (55% active, available from American Hoechst). The polymerization mixture was heated to 60° C. and one round of the following initiators were added: 1.9 grams of a 10% aqueous ammonium persulfate solution, 2.3 grams of a 0.1% ferrous sulfate solution and 2.5 grams of a 10% sodium hydrosulfite solution. The temperature was maintained at 65° C., and after 30 minutes another round of initiators was added as before. Polymerization continued for another hour and the sample was cooled and dried in an oven at 85° C. to provide solid microgel which was subsequently powdered.

An aqueous epoxy dispersion was then prepared from the microgel as follows: To a three liter kettle equipped with an anchor agitator, thermometer, and reflux condenser, the following were added: 915 grams of a commercially available powdered epoxy resin marketed under the trade designation Epi-Rez 540 by Celanese Specialty Resins Company, cpmprising a glycidyl polyether of Bisphenol A having an epoxide equivalent weight of 1600–2000; 306 grams of Epi-Rez 550 epoxy resin marketed by the same manufacturer, comprising a glycidyl polyether of Bisphenol A having an epoxide equivalent weight of 2400–4000; 415 grams of butyl Cellosolve (ethylene glycol monobutyl ether available from Union Carbide); and 610 grams of n-butanol. The mixture was stirred and heated to 105° C. to dissolve the epoxy completely. The solution was then cooled to 90° C. and 476 grams of the powdered microgel were dusted in and the admixture mixed thoroughly. Then 1285 grams of water were added, followed by the slow addition of 34 grams of an amine mixture composed of a 57/43 weight ratio of triethylamine/diethanolamine. As the mixture thickened, agitation was increased. Thereafter 3855 grams of water were added to provide a stable, aqueous dispersion of epoxy resin. Finally, when the dispersion had cooled, 38 grams of Cymel 303 aminoplast (hexamethoxymethyl melamine available from the American Cyanamid Co.) were added with subsequent stirring.

The stable, aqueous epoxy dispersion had a Zahn 2 viscosity of 34 seconds and a solids content of 22.2%.

The interior of 12 ounce aluminum and electrolytic tin plated (ETP) cans were coated with the coating composition using airless spray, to a dry film weight of 120 mg (beer weight) or 175 mg (beverage weight). The coatings were cured by baking for 60 seconds at an oven temperature of 188° C.

The continuity of the coatings was determined by a conductivity test carried out by filling the coated can with a 1% solution of sodium chloride in water and then determining the milliamperes of leakage current through the coating 30 seconds after a potential of 6.2 volts is applied between the salt solution and the can exterior. High readings indicate defects in the coating, e.g., craters, voids, bubbles, etc., which in use could result in contamination of the can contents and/or corrosion of the container. A milliamp reading (also referred to as an Enamel rater reading) of 0 to 25 is acceptable. The conductivity of the coatings was found to have an average, based on 24 cans, of 9.4 ma at beer weights, and 8.7 ma at beverage weights.

The blister threshold, i.e., the applied dry film weight at which blisters or bubbles form in the film from escaping solvent or water, was greater than 110 mg.

Films were cast from the coating composition onto electrolytic tin plated (ETP) steel panels to a dry film thickness of 0.2 mil using a wire wound Meyer rod. After baking at 188° C. for one minute, the films were well cured. The wet adhesion of the films was then tested as follows: Each of the film samples were immersed in a water bath at 82° C., and dilute acid to simulate the acidic nature of soft drinks. Within one minute of removal from the baths described above, the film surface was dried with a cloth and scribed with a cross-hatch pattern. A high tack cellophane tape was applied over the scribed portion and was removed with a jerk. The amount of film which remained on the panel was visually estimated and was rated as 10 for no removal and 0 for total removal.

The double coat adhesion was tested by applying a second coating over the first cured coating, using the same film weight and curing conditions as used for the first coating, and then estimating film removal as described above. The single and double coat wet adhesion of each of the films of this example was rated as 9–10.

Stain resistance of the coatings to Welch's strawberry soda was also excellent. Flavor tests detected no off-flavor with either water or beer. Gas chromatographic tests for residual solvents in the coating revealed less than 0.5 ppm of any solvents.

EXAMPLE 2

Following the procedure of Example 1, an epoxy dispersion was prepared utilizing the styrene/methacrylic acid/vinylacetate/divinyl benzene microgel of Example 1. The epoxy resin used for this dispersion was a Bisphenol A terminated epoxy of a molecular weight of about 3,000. The procedure for dispersion preparation was the same as used in Example 1. Aluminum cans sprayed with this dispersion were tested as in Example 1 and excellent wet adhesion results with ratings of 9–10 for single and double coatings were obtained.

EXAMPLE 3

To a 5 liter, three necked flask equipped with a stirrer, thermometer, and nitrogen inlet were added 1624 grams of water, 11.4 grams of Siponate DS-10 (a sodium dodecyl benzene sulfonate surfactant available from Alcolac, Inc.), 6.37 grams of a 10% aqueous solution of sodium hydrosulfite, and 7.4 grams of n-butanol. The following monomer mixture was prepared: 285 grams styrene, 169 grams methacrylic acid, 29 grams ethyl acrylate, and 10 grams divinyl benzene. 20% of this formulation was added to the polymerization reactor, stirring began, and the polymerization mixture heated to 65° C. Then 1.45 grams of a 10% ammonium persulfate solution and 4.6 grams of a 0.1% ferrous sulfate solution were added. The remaining monomer mixture was added over a period of 90 minutes along with 4.4 ml of a 10% ammonium persulfate solution diluted to 100 ml with water. Polymerization was done at 90° C. with tertiary butyl hydroperoxide added at the end of the monomer feeds to ensure complete polymerization of the monomers.

In a separate reactor equipped with a stirrer, thermometer, and reflux condenser, 114.4 grams of a Bisphenol A terminated epoxy resin of molecular weight of about 3000 were dissolved in 39 grams of butyl Cellosolve (ethylene glycol monobutyl ether available from Union Carbide), and 57 grams of butanol. To this epoxy solution were added 205 grams of the aqueous microgel emulsion prepared above and 17 grams of water. Thereafter, 11.2 grams of the amine mixture used in Example 1 were added to the mixture, followed by 323 grams of water. Finally, 10.2 grams of Cymel 303 (hexamethoxymethylmelamine available from the American Cyanamid Co.) were added. Aluminum cans coated with this dispersion exhibit excellent wet adhesion for single and double coats having ratings of 10, and meet all properties required for sanitary linings of cans used for packaging beer and soft drinks.

EXAMPLE 4

A series of aqueous dispersions of mixed epoxy and phenolic resins was prepared employing the aqueous styrene/methacrylic acid/ethyl acrylate/divinyl benzene microgel emulsion of Example 3 as stabilizer. Each of these dispersions were prepared by dissolving 97 grams of a Bisphenol A terminated epoxy resin of molecular weight 3000 and 17.2 grams of a selected phenolic resin in 39 grams butyl Cellosolve and 57 grams n-butanol. To this solution were added 205 grams of the aqueous microgel emulsion. 17 grams of water were then added, followed by 11 grams of the amine mixture used in Example 1. Thereafter, 323 grams of deionized water were added followed by 10 grams of Cymel 303. The phenolic resins employed in each of these dispersions included Varcum 8357, 5416, 8345, 2980 and 5797 (Reichhold), and Phenodur 285 and 307 (American Hoechst).

The resulting dispersions were tested as food can coatings on tin plate and exhibited good properties in tests for blush resistance, solvent resistance, single and double coating wet adhesion, fabrication testing such as bending and food stain resistance to tomato paste and dog food. The single and double coating wet adhesion of those coatings was rated at 8–9.

EXAMPLE 5

An aqueous epoxy dispersion was prepared using a microgel formulation prepared as in Example 3, but containing a monomer mix consisting of 142 grams of styrene, 142 grams of methyl methacrylate, 169 grams of methacrylic acid, 29 grams of ethyl acrylate and 10 grams of divinyl benzene. The epoxy employed in this dispersion comprised a Bisphenol A terminated epoxy of molecular weight 3000. With these exceptions, the dispersion preparation was otherwise in accordance with Example 3. When tested as a coating for aluminum cans at beer and beverage weights, excellent single and double coating wet adhesion results, with a rating of 8–10, were obtained.

EXAMPLE 6

Following the procedure of Example 3, an epoxy dispersion utilizing microgel identical to that of Example 3 except that the amount of divinyl benzene in the monomer mix was reduced from 10 grams to 5 grams was prepared. In order to provide an acceptable application viscosity, the solids level of the dispersion was also adjusted to 18%. Films on aluminum cans obtained from this dispersion were tested and exhibited good wet adhesion properties for single and double coatings with ratings of 9-10.

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

What is claimed is:

1. A process for preparing a stable aqueous dispersion of water-dispersible organic film-forming resin, comprising the steps of:
   a. dissolving at least one water-dispersible organic film-forming resin in a water-miscible organic solvent to form a solution of said resin, wherein the film-forming resin is selected from the group consisting of heat-curable, thermosetting epoxy resins, phenolic resins, alkyd resins, polyester resins, aminoplast resins and mixtures thereof and wherein the organic solvent has a boiling of about 150° F. to about 500° F.;
   b. separately preparing a stabilizer for said film-forming resin comprising water-swellable, crosslinked microgel particles having a stability in aqueous media of at least about one week when an aqueous dispersion of said microgel particles of about 20% solids content is maintained at 140° F. by polymerizing in an aqueous emulsion a monomer mixture comprising:
      (i) a major amount of at least one polymerizable carboxylic acid group-free polymerizable vinyl monomer selected from the group consisting of polymerizable vinyl aromatic monomers, methacrylate ester monomers, nitrile monomers, vinyl halide monomers, mixtures thereof, and mixtures thereof with minor amounts of vinyl ester monomers and alkyl acrylate monomers,
      (ii) from about 10 to 50%, based on the total monomer weight, of at least one polymerizable vinyl monomer selected from the group consisting of $\alpha,\beta$-ethylenically unsaturated carboxylic acid monomers and mixtures thereof, said carboxylic acid monomers being substantially non-gelling when copolymerized with said acid group-free monomers in an aqueous emulsion, and
      (iii) from a small amount sufficient to crosslink the microgel particle up to about 5%, based on the total monomer weight, of a difunctional crosslinking monomer having at least two polymerizable double bonds;
   c. adding and admixing together from about 10 to about 50% by weight, based on the total solids weight of the dispersion, of the microgel particles of step (b) to the solution of said film-forming resin;
   d. at least partially neutralizing the admixture with ammonia or a volatile organic amine in an amount sufficient to provide a pH of about 2 to about 10 to said aqueous dispersion; and
   e. dispersing the admixture into an aqueous medium to provide a stable aqueous resin dispersion having a total solids content of from about 15 to about 40 weight percent.

2. The process of claim 1, wherein said film-forming resin is present in an amount of from about 50 to about 90% by weight, based on the total solids weight of the dispersion, said water-miscible organic solvent comprises less than about 20% by weight, based on the total weight of the dispersion, and said microgel particles comprise from about 10 to about 50% by weight, based on the total solids weight of said aqueous resin dispersion.

3. The process of claim 1, further comprising the step of adding an aminoplast resin to said aqueous resin dispersion after step(e).

4. The process of claim 2, wherein said aqueous resin dispersion has a solids content of from about 20 to about 30% by weight, and said water-miscible organic solvent is present in an amount just sufficient to dissolve said film-forming resin.

5. The process of claim 2, wherein said microgel particles have a stability in aqueous media of at least about four weeks when an aqueous dispersion of said microgel particles of about 20% solids content is maintained at 140° F.

6. A process for preparing a stable aqueous dispersion of at least one water-dispersible, heat curable thermosetting organic film-forming resin suitable for use as a protective coating composition, comprising the steps of:
   a. preparing a solution of at least one water-dispersible, thermosetting film-forming resin selected from the group consisting of epoxy resins comprising a glycidyl polyether of a polyhydric phenol or hydrogenated phenol containing an average of more than one epoxide group per molecule and having an epoxy equivalent weight in the range between about 150 and 8000, phenolic resole resins, and mixtures thereof, in a water-miscible organic solvent having a boiling point of about 150° F. to about 500° F., said organic solvent forming less than about 20% by weight of the total dispersion;
   b. separately preparing a stabilizer for said film-forming resin comprising water-swellable, crosslinked microgel particles having a stability in aqueous media of at least about four weeks when an aqueous dispersion of said microgel particles of about 20% solids content is maintained at 140° F. by polymerizing in an aqueous emulsion a monomer mixture comprising:
      (i) from about 10-50%, based on the total monomer weight, of methacrylic acid,
      (ii) from a small amount sufficient to cross-link the microgel particle up to about 5%, based on the total monomer weight, of divinylbenzene,
      (iii) from about 0 to about 50%, based on the total monomer weight, of methyl methacrylate,
      (iv) from about 0 to about 10%, based on the total monomer weight, of ethyl acrylate, vinyl acetate and mixtures thereof, and
      (v) from about 10 to about 90%, based on the total monomer weight, of styrene;
   c. adding and admixing together from about 10 to about 50% by weight, based on the total solids weight of the dispersion, of the microgel particles of step (b) to the solution of said film-forming resin;
   d. at least partially neutralizing the admixture with ammonia or a volatile organic amine in an amount sufficient to provide a pH of about 2 to about 10 to said aqueous dispersion;

e. dispersing the admixture into an aqueous medium to provide a stable aqueous resin dispersion having a total solids content of from about 15 to about 40 weight percent; and f. adding from about 0 to about 10% by weight, based on the total solids weight of the dispersion, of an aminoplast resin to said aqueous resin dispersion.

7. The process of claim 6, wherein said monomer mixture comprises methacrylic acid, styrene, vinyl acetate and divinylbenzene.

8. The process of claim 6, wherein said monomer mixture comprises methacrylic acid, styrene. ethyl acrylate and divinylbenzene.

9. The process of claim 6, wherein said monomer mixture comprises methacrylic acid, styrene, ethyl acrylate, methyl methacrylate and divinylbenzene.

* * * * *